Nov. 8, 1949 W. P. COUSINO 2,487,426
INJECTION MOLDING APPARATUS AND METHOD
Filed Feb. 5, 1944 4 Sheets-Sheet 1

Fig. 1.

INVENTOR
*Walter P. Cousino.*
BY
*Harness & Harris.*
ATTORNEYS.

Nov. 8, 1949        W. P. COUSINO        2,487,426

INJECTION MOLDING APPARATUS AND METHOD

Filed Feb. 5, 1944        4 Sheets-Sheet 3

INVENTOR.
Walter P. Cousino
BY
Harness & Harris
ATTORNEYS.

Nov. 8, 1949     W. P. COUSINO     2,487,426
INJECTION MOLDING APPARATUS AND METHOD
Filed Feb. 5, 1944     4 Sheets-Sheet 4

INVENTOR.
Walter P. Cousino.
BY
Harness & Harris.
ATTORNEYS.

Patented Nov. 8, 1949

2,487,426

UNITED STATES PATENT OFFICE 2,487,426

INJECTION MOLDING APPARATUS AND METHOD

Walter P. Cousino, Detroit, Mich., assignor to Chrysler Corporation, Highland Park, Mich., a corporation of Delaware Application February 5, 1944, Serial No. 521,197

28 Claims. (Cl. 18—30.)

This invention relates to an improved injection molding apparatus and method and is an improvement over my application Serial No. 471,693, filed January 8, 1943, now Patent No. 2,402,805.

More particularly, the invention pertains to improvements in an apparatus and method of this kind by which can be discharged substantially continuously and under pressure for molding, extruding and other purposes, materials of a wide variety of compositions and physical properties, including compounds comprising natural rubber, synthetic rubber, ceramics, thermosetting and thermoplastic resins, metals and numerous other moldable and extrudable compounds.

One of the main objects of this invention is to provide for reversing the action of the pressure-creating mechanism of a device of this kind, throughout a cycle of predetermined duration substantially immediately after an injecting operation in order to relieve the pressure on the contents of the apparatus between successive injecting operations and to thus guard against setting up of the material operated upon, particularly when such material is of a heat-hardening nature.

Another object of the invention is to reverse the pressure-creating mechanism sufficiently to substantially decrease the starting torque requirement during initial stages of reactuation of the pressure-creating mechanism.

A further object of the invention is to provide apparatus for automatically performing the forward drive and reverse operations of the pressure created mechanism during mold filling operations and immediately thereafter, respectively.

Another object of the invention is to provide apparatus which is responsive to overflow of moldable material from the injecting apparatus when opposition to discharge therefrom is occasioned by filling of the mold, for actuating the drive reversing means.

Still further objects of the invention are to provide in injecting apparatus of this character and an associated mold, an operating mechanism for the latter, a control system which retains the injecting apparatus inoperative until the sections of the mold are urged together by a predetermined pressure, and to provide a control system of this kind which retains the injecting apparatus inoperative until the mold inlet and discharge nozzle of the injecting apparatus are disposed in proper mold-filling relationship.

An additional object of the invention is to provide a control system for a combined injecting unit and mold assembly which, immediately following filling of the mold, automatically reverses the direction of the drive of the pressure-created mechanism, closes the discharge passage of the nozzle of the injecting unit in a manner which holds the contents of the mold against backflow therefrom, and accommodates escapement of compound from the interior of the injecting apparatus in order to guard against unintended setting of such compound under pressure therein.

Another object of the invention is to provide improved means for feeding moldable compound into the injecting apparatus at a variable rate in order to variably predetermine the rate of discharge from the apparatus while operating it at a constant speed.

An illustrative embodiment of the invention is shown in the accompanying drawings, in which.

While the injecting apparatus is shown in the drawings associated with mold structure, it can be readily applied to an extruding die. The injecting apparatus, best shown in Fig. 2, comprises a tubular body portion, generally designated by the numeral 10, having an upper section 11, an intermediate section 12, and a heating chamber 13 to which is attached a nozzle body 14 having a discharge nozzle element 15 attached to its extreme end.

The intermediate section 12 is provided with a bore 16 which is axially aligned with the passage 17 in the heating chamber as well as with the discharge passages 18 and 19 of the nozzle body 14 and nozzle element 15, respectively. A conveyor-like screw 20 extends through the bore 16 and is provided with a thread 21 which relatively closely fits the wall of the bore 16 and which extends through the interior of the upper section 11 to a location adjacent the lower extremity of the intermediate section 12 of the apparatus. Provided on respectively opposite sides of the bore 16 are chambers 22 and 23 which are formed in part by slots 24 and 25, respectively provided through the wall structure of the intermediate section 12, and in part by recesses 26 and 27 of caps 28 and 29, respectively, which are mounted on the sides of the intermediate section 12 in alignment with the slots 24 and 25 thereof.

Rotatably mounted in each chamber 22 and 23 is a gear-like element 30 and 31, respectively, having teeth meshed with the thread 21 of the screw 20 in a worm and gear relationship. Each of the gears 30 and 31 have bosses 33 extending from their opposite sides which are journalled in aperture 34 formed partially in the wall structures of the intermediate section 12 and partly in the caps 28 and 29. The bosses 33 are rotatably received within bearing elements 35 disposed in the apertures 34 which are held against axial displacement from the apertures 34 by plugs 36 and 37. The plug 36 comprises a metal disc having its peripheral portion seated in a groove 38 formed in the wall structure of the intermediate section 12 and associated cap. The plug 37 comprises a metal sleeve having a radially extending flange 39 seated in a groove 40 similar to the groove 38. The plug 37 is provided with a central threaded aperture in which a threaded plug 41 is disposed. The plug 41 engages the extremity of one boss 33 of each gear and serves to hold the opposite extremity of the other boss 33 thereof against an abutment 42 provided on the inner side of the plug 36.

The gears 30 and 31 serve as rotatable dams and the teeth thereof extend into the groove of the thread 21 of the screw 20 to positively oppose turning of material operated upon by the thread of the screw with the latter. In this manner, a pressure is positively built up upon the material within the bore 16 of the intermediate section 12, as well as upon the material contained in the passage 17 of the heating member 13. The teeth of the gears 30 and 31 are meshed with the thread 21 of the screw 20 at a location spaced from the inlet end 43 of the intermediate section 12. There is at least one complete full turn of the thread of the screw 20 which is in close fitting relationship with respect to the wall of the bore 16 between the inlet end of the bore 16 and the location at which the slots 24 and 25 communicate therewith. With this construction any material operated upon by the screw which is displaced from the bore 16, by reason of its being carried between the teeth of the gears 30 and 31, is returned to the bore at a location at which the material is at least initially compressed by the thread of the screw. Therefore, the moldable material which thus flows through the chambers 22 and 23 is not removed from a zone of high pressure to a zone of atmospheric pressure and accordingly compressive work which has been done on this material is not lost.

Figures 7, 9:
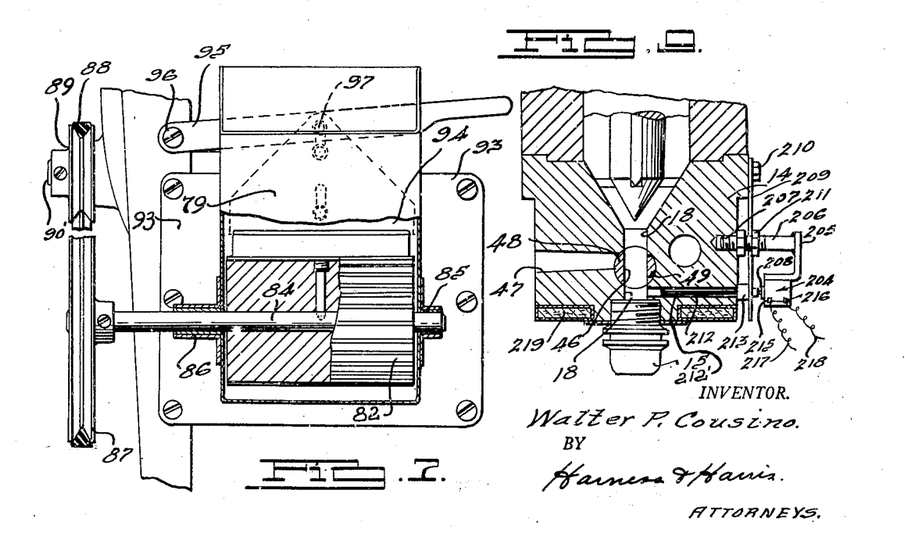
Fig. 7 is a fragmentary sectional view of the feed mechanism illustrated in Fig. 6 and taken on line 7—7 of the latter figure.
Fig. 9 is a vertical sectional view taken on the line 9—9 of Fig. 2, showing a further development of the invention.

The nozzle body 14 has a tapered passage 44 leading from the passage 17 of the heating member 13 to the passage 18 which in turn communicates with the outlet passage 19 of the nozzle element 15. Mounted in the nozzle body 14 is a valve mechanism comprising a valve element 45 having a passage 46 extending diagrammatically therethrough for accommodating the flow of material under compression through the passage 18 in the nozzle body and through the discharge passage 19 of the nozzle element 15. The open position of the valve 45 is shown in Fig. 9. The nozzle body is also provided with an escapement port 47, shown in Fig. 9, which is normally closed by the wall portion 48 of the valve element 45 when the latter is in the open position illustrated in this figure. When the valve element 46 is rotated substantially 90° in a counter-clockwise position from the position shown in Fig. 9, the wall portion 48 of the valve element closes the passage 18 at a location below the valve element so as to positively obstruct reverse flow of material from a mold with which the nozzle element 15 is engaged during operation. When the valve element 46 is in the latter described or closed position, a wall portion 49 of the valve element is disposed partially across the portion of the passage 18 above the valve element. The wall portion 49 is not of sufficient arcuate extent to completely close the passage 18 and therefore material under compression in the apparatus may flow out through the escapement port 47. By reducing the pressure under which the material contained in the passage 17 of the heating member and the passages of the nozzle body 14 is maintained, unintended setting-up of material such as thermosetting plastic, or vulcanizable rubber compound under pressure in the heated portion of the apparatus is respectively guarded against.

The heating member 13 is provided with heating elements 50 and 51 and a spreader 52 is attached to the lower end of the screw 20 so as to bring the material into close contact with the wall of the heating unit. The spreader 52 has a tapered lower end portion which extends into the tapered passage 44 of the nozzle body. The lower end portion of the spreader 52 is provided with arcuately spaced radially extending blades 53 which contact the walls of the passage 17 and the conical-shaped wall of the tapered passage 44 to retain the spreader in axial alignment with the passage 17. The spreader is thus maintained in a central portion throughout its length so as to bring a layer of plastic material of uniform thickness into heat receiving relationship with respect to the heated walls of the heating unit, thereby uniformly heating the plastic material as it passes through the heating unit.

Figure 1:
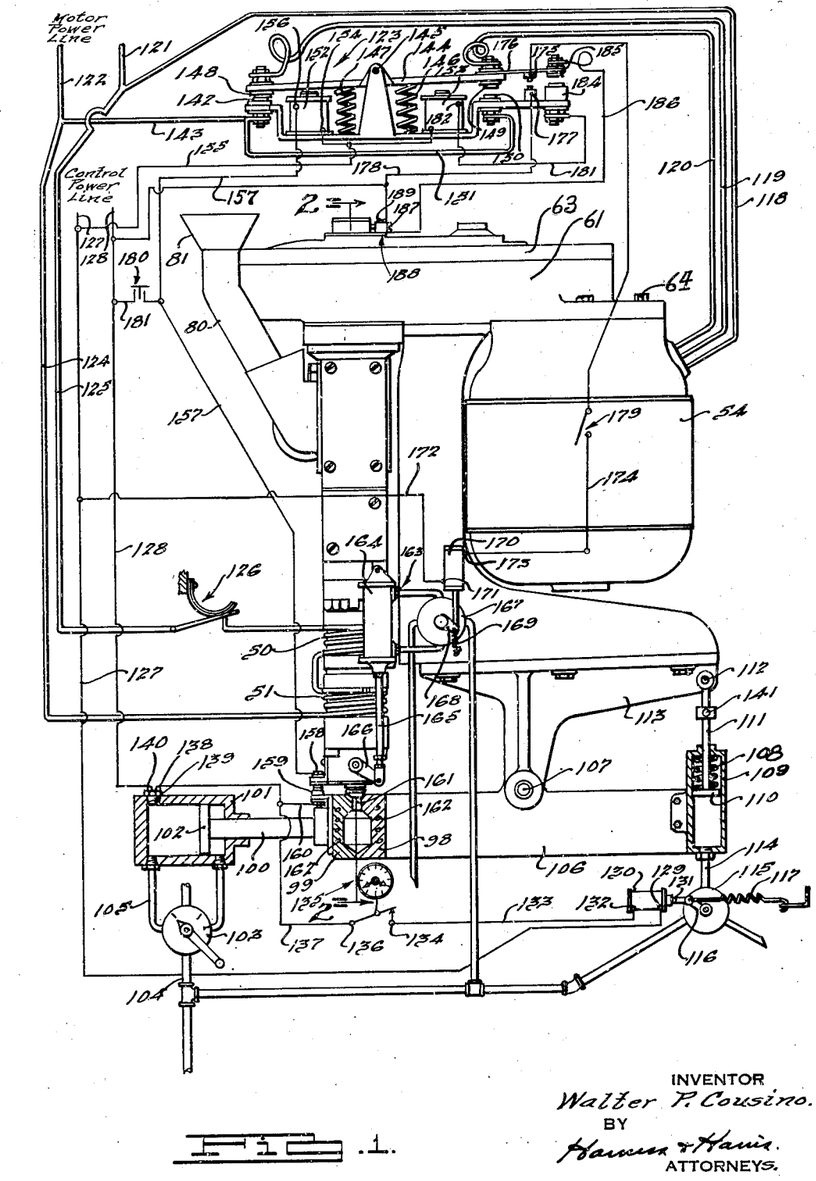
Fig. 1 is a side elevational view, partly in section, of the improved injection molding apparatus diagrammatically showing a control system therefor and embodying the invention.
Figures 5, 6:
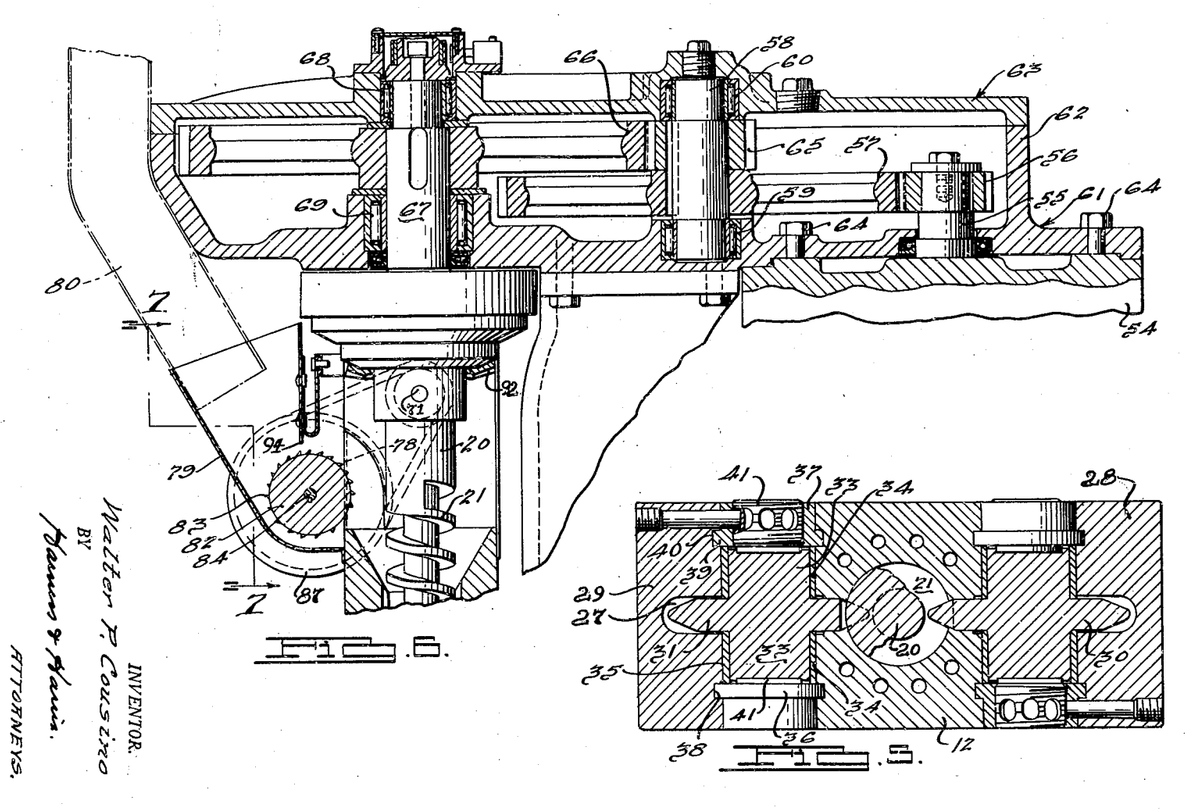
Fig. 5 is a transverse sectional view taken on the line 5—5 of Fig. 2.
Fig. 6 is a fragmentary, vertical sectional view of the driving mechanism for propelling the pressure-creating apparatus of the injecting unit, showing portions of the device for feeding moldable material thereto.

The mechanism for driving the screw 20 and gears 30 and 31 is shown in Fig. 6 to include an electric motor 54 having a shaft 55 on which is mounted a pinion 56. The pinion 56 is meshed with the gear 57 which is fixed to a shaft 58. The shaft 58 is journalled in bearings 59 and 60 which are mounted in a transmission housing, generally designated by the numeral 61, comprising a body portion 62 and a cover portion 63. The motor 54 is suspended from the body portion 62 of the transmission housing by bolts 64, as illustrated in Figs. 1 and 6. A pinion 65 fixed to the shaft 58 which is rotated by the gear 57, is meshed with a gear 66. The gear 66 is keyed to a spindle 67 journalled in bearings 68 and 69 mounted respectively in the body portion 62 and cover 63 of the transmission housing. The spindle 67 is axially aligned with the screw 20 and with the bore 16 in which the screw 20 is received. This spindle has a coupling 70 on its lower end to which the upper end of the screw 20 is nonrotatably fixed by a pin 71. The transmission housing 61 is spaced vertically from the intermediate section 12 of the injecting apparatus and is detachably connected with the intermediate section 12 by a tubular structure, preferably formed integral with the transmission housing body portion 62 and which has heretofore been designated the upper section of the injecting unit.

A chamber 72 within the tubular upper section 11 serves as an inlet chamber for the purpose of receiving material to be operated upon by the screw and discharged from the injecting apparatus. Formed in the wall of the upper section 11 is an opening 78 for accommodating feeding of material to the chamber 72. A hopper 79 is mounted on the side of the apparatus in registration with the opening 78. This hopper has an upper end portion which is flared outwardly for receiving material from a duct 80 which has a funnel-shaped upper end portion 81 into which the material may be introduced from a container or other source.

Figures 2, 3, 4:
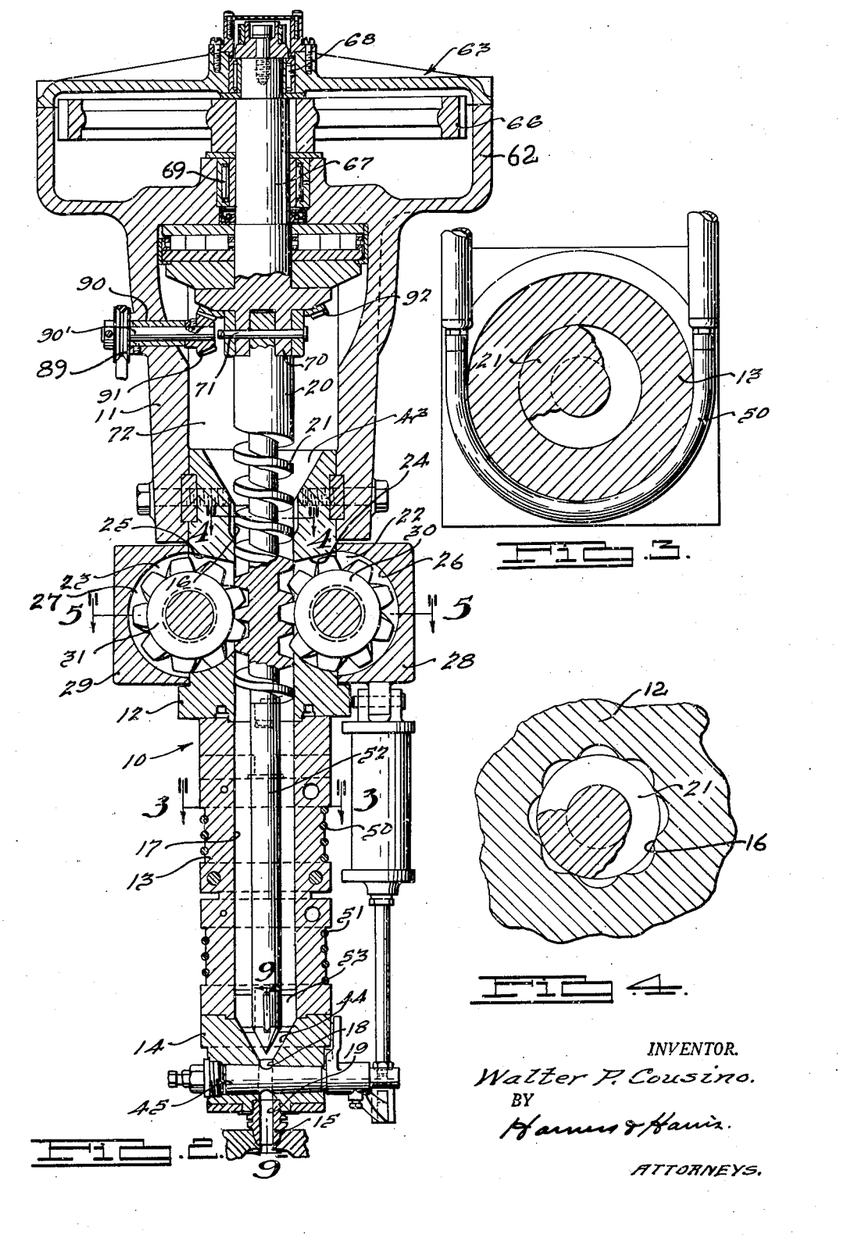
Fig. 2 is a vertical sectional view taken on the line 2—2 of Fig. 1.
Fig. 3 is a transverse sectional view taken on the line 3—3 of Fig. 2.
Fig. 4 is a fragmentary transverse sectional view taken on the line 4—4 of Fig. 2.

Rotatably mounted in the hopper 79 is a feeding drum 82 having vanes 83 extending from its periphery. The drum 82 is carried by shaft 84 journalled in bearings 85 and 86 mounted on the side walls of the hopper. A pulley 87 fixed to the shaft 84 is drivingly connected by a belt 88 which passes around a pulley 89 mounted on a shaft 90' which, as shown in Fig. 2, is journalled in a bearing 90 extending through the wall structure of the upper section 11. A bevelled pinion 91 is provided on the internal end of the shaft 90' and meshed with the bevelled gear 92 which is carried by the spindle 67 and rotated therewith. The entire hopper and feeding drum unit may be conveniently attached to the injecting unit by providing flanges 93 on the side walls of the hopper 79 which are adapted to be secured to the side of the upper section 11 in which the opening 78 is formed. The feeding drum 82 is thus rotated in time relation to rotation of the screw 20 and serves to transfer material from the hopper 79 to the chamber 72 from which such material passes into the upper flared end 43 of the bore 16.

The quantity of material thus delivered to the chamber 72 per rotation of the screw 20 may be variably predetermined by adjustably positioning a gate 94 which is shiftably mounted above the feeding drum 82. This gate is adapted to variably predetermine the size of the opening between the hopper and the drum 82 through which the material passes in its travel to the chamber 72. An operating lever 95, pivotally mounted at 96, is attached at 97 to the gate 94 for the purpose of adjustably positioning it.

The motor 54 is of a reversible driving type and is provided with control mechanism which effects a forward driving for discharging material from the injecting apparatus for mold-filling operations and which temporarily reverses the drive of the motor for a cycle of predetermined duration as soon as the mold has been filled. This mechanism, as well as other control features of the mechanism, is illustrated in Fig. 1 of the drawings.

The apparatus is also illustrated in Fig. 1 in combination with a mold and mold-operating apparatus as well as control mechanism therefor. The mold illustrated comprises a fixed mold section 98 and a shiftable mold section 99 which is adapted to be moved into and out of mating relationship with respect to the fixed mold section. The shiftable mold section 99 is carried by a piston rod 100 which is slidably mounted on a cylinder 101 and provided with a piston 102 which is disposed in the cylinder 101. The interior of the cylinder is adapted to be connected through the valve mechanism 103 with a source of fluid pressure medium which is supplied to the valve from a pipe 104. The valve 103 is adapted to selectively apply fluid pressure on one side of the piston 102 and exhaust the other side thereof in a conventional manner. When fluid medium is admitted through the pipe 105 leading from the valve 103 to the left end of the cylinder 101, the shiftable die section 99 is forcefully urged into contact with the stationary mold section 98.

The fixed mold section 98 may be mounted on a support 106 on which is pivotally mounted at 107 the injecting unit. The injecting unit is so positioned with respect to the mold as to bring the lower end portion of the nozzle element 15 which is preferably of arcuate shape into registering and contacting relation with the inlet of the mold as illustrated in Fig. 1. The inlet of the mold is preferably formed to mate with the curvature of the extreme lower end portion of the nozzle element 15 in order to provide an effective seal between the nozzle and the mold.

Normally the injecting unit is yieldably urged in a clockwise direction about the pivot 107 by a spring 108 so as to move the nozzle element away from the mold. The spring 108 is contained in a cylinder 109 and acts between one end of the cylinder and the piston 110, carried by a piston rod 111. The piston rod 111 is pivotally attached at 112 to a support 113 on which the injecting unit is mounted. The piston 110 is adapted to be urged upwardly, as viewed in Fig. 1, for rotating the injecting unit in a counter-clockwise direction about the pivot 107 by fluid pressure medium supplied to the lower end of the cylinder 109 by a pipe 114. The pipe 114 leads from a valve 115 which may be manipulated to selectively supply fluid under pressure to the cylinder 109 and exhaust such fluid therefrom in a conventional manner. The valve 115 has a valve lever 116 by which it is operated in a manner hereinafter set forth. Normally the valve is held in a closed position by a spring 117.

For the purpose of illustrating a forward and reverse driving motor and power supply system therefor, three conductors are shown in Fig. 1 to lead to the motor 54. The right hand conductor 118 and the middle conductor 119 are utilized to actuate the motor to produce a forward drive and the conductor 118 and left conductor 120 are utilized to actuate the motor to produce a reverse drive. The conductor 118 is connected directly to one wire 121 of the power line and the other wire 122 of the power line may be connected in a predetermined sequence, hereinafter set forth, to the conductors 119 and 120 by suitable switch mechanism shown in Fig. 1 and designated by the numeral 123. Conductors 124 and 125 leading from the wires 122 and 121, respectively, of the power line supply current to the heating elements 50 and 51 which surround the heating member 13. Disposed in this circuit in which the heating elements 50 and 51 are connected is a thermostatic switch, designated by the numeral 126, which may be disposed in any desired location for limiting the temperature to which the material in the injecting unit is subjected.

A control circuit is provided for initiating and terminating the forward driving cycle of the motor 54 as well as the reverse driving cycle thereof. This control circuit includes a control power line comprising conductors 127 and 128. The conductor 127 is connected to one terminal 129 of a solenoid 130 having a shiftable bar member 131 operatively attached to the control lever 116 of the valve 115 which serves to supply fluid medium to the cylinder 109 for the purpose of rotating the injecting apparatus into mold filling engagement with the mold. The solenoid 130 has a terminal 132 which is connected by a conductor 133 with a terminal 134 of a time switch, generally designated by the numeral 135. The other terminal 136 of the time switch 135 is connected by a conductor 137 with one terminal 138 of a pressure responsive switch 139 which is mounted on the cylinder 101 and adapted to be closed when the pressure in the cylinder 101 on the left side of the piston 102 attains a predetermined value. The other terminal 140 of the pressure switch 139 is connected with the conductor 128 of the control power line. The purpose of the pressure responsive switch 139 is to guard against actuation of the valve 115 by the solenoid 130 to rotate the injecting apparatus in the mold filling position before the mold is held in closed position by a force of a predetermined value sufficient to withstand unintended separation of the mold sections by the pressure applied thereon during a mold filling operation. If the pressure responsive switch 139 is closed as a result of the attainment of sufficient pressure in the cylinder 101 to properly retain the mold sections in contacting relationship, then when the time switch 135 is closed by the operator the valve operating lever 116 will be rotated in a counterclockwise direction, as viewed in Fig. 1, to supply fluid under pressure to the lower end of the cylinder 109, thus rotating the injecting apparatus about the pivot 107 and against the action of the spring 108 and forcefully holding the nozzle element 15 in contact with the inlet of the mold. When the time switch 135 is opened after a predetermined period, the spring 117 returns the valve mechanism 115 to a closed position to accommodate exhausting of fluid from the cylinder 109 and expansion of the spring 108 which rotates the injecting unit about the pivot 107 in a clockwise direction. The clockwise rotation of the injecting unit is limited by the adjustable stop 141 mounted on the rod 111 and which is adapted to engage the upper end of the cylinder 109.

The motor drive controlling switch mechanism, generally designated at 123, includes a fixed contact member 142 which is electrically connected by a conductor 143 with the wire 122 of the motor power line. This switch mechanism comprises a pivotally mounted lever 144 which is pivotally supported intermediate its ends at 145. The lever 144 is normally yieldably held in a neutral, substantially horizontal position, as viewed in Fig. 1, by coil springs 146 and 147 disposed on opposite sides of the pivot 145. A contact 148 is mounted on the left end of the pivoted lever 144 in position to register and contact with the fixed contact member 142. The middle wire 119 leading from the motor 54 is connected with the movable contacting member 148. When the contact members 148, 142 are engaged together, a circuit is completed from the power line 121 through the conductors 118 and 119 leading from the motor in order to drive the latter in a forward direction. Provided on the right end of the pivotally mounted switch lever 144 is a contact 149 which registers with and is adapted to engage a fixed contact 150. The fixed contact 150 is connected by a conductor 151 with the conductor 143. When the movable contact 149 and fixed contact 150 are engaged, a circuit is completed through the right hand wire 118 and the left hand wire 120 leading from the motor 54 in order to drive the motor in a reverse direction.

Operation of the switch mechanism 123 is effected by forward and reverse drive control circuits respectively. A solenoid 152 disposed beneath the pivotally mounted lever 144 at a location on the left side of the pivot 145 serves to hold the contact 148 in engagement with the contact 142 and a solenoid 153 disposed beneath the lever 144 at a location on the right hand side of the pivot 145 serves to hold the contact 149 in engagement with the fixed contact 150. One terminal 154 of the solenoid 152 is electrically connected directly by the conductor 155 with the conductor 127 of the control power line. The other terminal 156 of the solenoid 152 is electrically connected by a conductor 157 with a movable switch contact element 158 mounted on the nozzle body 14 as shown in Fig. 1. The switch contact element 158 is adapted to register with and engage a contact element 159 mounted on the shiftable mold section 99 when the latter is in closed position with respect to the fixed mold section 98 provided the injecting unit is disposed in mold-filling relation with the mold structure. The fixed contact element 159 is electrically connected by a conductor 160 with the conductor 137 which is in turn connected through the pressure responsive switch 139 to the other conductor 128 of the control power line. This circuit is operative when the time switch is closed and the contacts 158 and 159 are engaged provided the pressure responsive switch 139 is also closed. When these conditions exist, it is assured that the mold sections are urged together with the required force, and that the nozzle of the injecting apparatus is properly disposed in mold-filling position. Closing of the time swtich 135 while the above conditions exist, causes the solenoid 152 to be energized, thereby retaining the lever 144 in the position shown in Fig. 1 in which the contacts 142 and 148 are engaged to establish a forward drive of the motor 54 and conveyor screw 20 with which the motor is connected by the foregoing transmission mechanism.

After the mold is filled under pressure by operation of the screw 20 in a forward direction, the material which builds up in the sprue and inlet 161 of the mold exerts a back pressure upon the nozzle element 115 thereby rotating the injecting unit about the pivot 107 and against the action of fluid medium on the piston 110, sufficiently to separate the contact elements 158 and 159, thus de-energizing the solenoid 152. When the solenoid 152 is de-energized, the spring 147 restores the switch lever 144 to its neutral or substantially horizontal position. The contacts 142 and 148 are thus disengaged and the forward driving circuit of the motor 54 is opened.

As the material injected by the apparatus tends to overflow from the inlet of the mold, a film of such material oozes out between the surface of the nozzle element and the surface surrounding the inlet of the mold which serves as a seat for the nozzle. This film of material effectively insulates the nozzle element 15 from the mold thereby serving to prevent excessive conductivity of heat from the mold to the nozzle and to any of the material being molded which remains in the passage 19 of the nozzle element as well as the material in the nozzle body and lower end portion of the heat chamber. In the molding of heat curing moldable compounds, such as thermosetting resin or vulcanizable materials including natural and synthetic rubber compounds, the mold sections are preferably heated by heating elements 162. The plastic occupying the mold inlet passage 161 which is relatively constricted, sets rapidly at the temperature of the mold and forms a plug which assists in retaining the plastic in the mold cavity under compression and inasmuch as the nozzle element 15 is lifted but slightly from the mold by the back pressure exerted on the nozzle when the mold is filled, and since the space between the lifted nozzle element and the mold is filled with the film of material, substantial reduction in the pressure on the material in the mold is guarded against. Even while the nozzle is in its slightly lifted position, it serves to obstruct back flow of material from the cavity of the mold until a plug is formed in the inlet 161 of the mold.

The valve 45 which controls the discharge of the material from the nozzle element 15 is maintained in an open position by fluid pressure control mechanism, generally designated by the numeral 163, while the forward motor driving circuit is closed. This fluid pressure control mechanism comprises a cylinder 164 having a piston therein connected by a piston rod 165 with a valve lever 166 which is attached to the valve element 45. The valve control mechanism 163 also includes a fluid medium control valve 167 from which fluid under pressure may be supplied to the upper end of the cylinder 164 in order to retain the valve element 45 in an open position or to the lower end of the cylinder 164 in order to retain the valve 45 in a closed position. The fluid medium control valve 167 has a valve lever 168 which is normally urged in a clockwise direction, as viewed in Fig. 1, by a spring 169 in order to supply fluid medium to the upper end of the cylinder 164 so as to normally retain the nozzle valve element 45 in its open position.

An electric control circuit is provided for operating the fluid pressure medium valve 167 to supply fluid medium to the lower end of the cylinder 164 in order to shift the nozzle valve 45 to its closed position. This control circuit includes a solenoid 170 having a terminal 171 connected by a conductor 172 with the conductor 127 of the power control line. The other terminal 173 of the solenoid 170 is electrically connected by a conductor 174 with a contact element 175. The contact element 175 is carried by a yieldable spring leaf 176 which extends rightwardly beyond the right hand extremity of the pivotally mounted switch lever 144. The contact 175 which is carried by the yieldable spring leaf 176 registers with and is adapted to engage a contact 177 when the lever 144 is either in its neutral, substantially horizontal position, or when it is tilted in a clockwise direction from its neutral position to engage the contacts 149 and 150 of the reverse motor driving circuit. The fixed contact 177 is electrically connected by a conductor 178 with the other conductor 128 of the control power line. When the contacts 175 and 177 are engaged, which condition exists when the pivoted switch lever 144 is in its neutral position or in its reverse drive establishing position, a circuit is completed through the solenoid 170 to actuate the latter for rotating the lever 168 of the fluid medium control valve 167 in a counter-clockwise direction against the action of the spring 169 so as to supply fluid medium to the lower end of the cylinder 164, thereby operating the nozzle valve element 45 to its closed position. Provided in the conductor 174 is a normally closed manually operable switch 179 which may be opened so as to de-energize the solenoid 170 while the contacts 175 and 177 are engaged in order to open the nozzle valve 45 at the will of the operator for cleaning or other purposes. If it is desired to operate the screw 20 in a forward direction while the valve element 45 is retained in open position in order to clean out the nozzle and possibly portions of the heating chamber of the injecting apparatus, the solenoid 152 may be energized to close the forward drive circuit of the motor by a normally open operable switch, generally designated by the numeral 180, which is connected in a conductor 181 having one end electrically connected with the conductor 128 of the control power line and its other end electrically connected with the conductor 157. Closing of the switch 180 shunts out the contact elements 158 and 159, thus permitting the solenoid 152 to be energized for closing the forward drive circuit of the motor regardless of whether the pressure responsive switch 139 or the switch contacts 158 and 159 are closed. The switch 180 may thus be manipulated at the will of the operator to displace small increments of the material from the injecting apparatus for the purposes of cleaning or inspection.

Energizing of the solenoid 153, which moves the pivoted switch lever 144 to a reverse drive establishing position, is controlled by a circuit which has a conductor 181 connected at one end to one terminal 182 of the solenoid 153. The other end of the conductor 181 is connected to a contact element 184 which is mounted below and in registration with a movable contact element 185 supported on the flexible leaf spring 176, as shown in Fig. 1. The fixed contact 184 and movable contact 185 are adapted to be engaged when the pivoted switch lever 144 is in its neutral, substantially horizontal, position as well as when it is in its reverse drive-establishing position. A conductor 186 is connected at one end to the contact element 185 and at its other end to one terminal 187 of a switch generally designated by the numeral 188. The other terminal 189 of the switch 188 is electrically connected with the conductor 178 which leads to the conductor 128 of the control power line.

Figure 8:
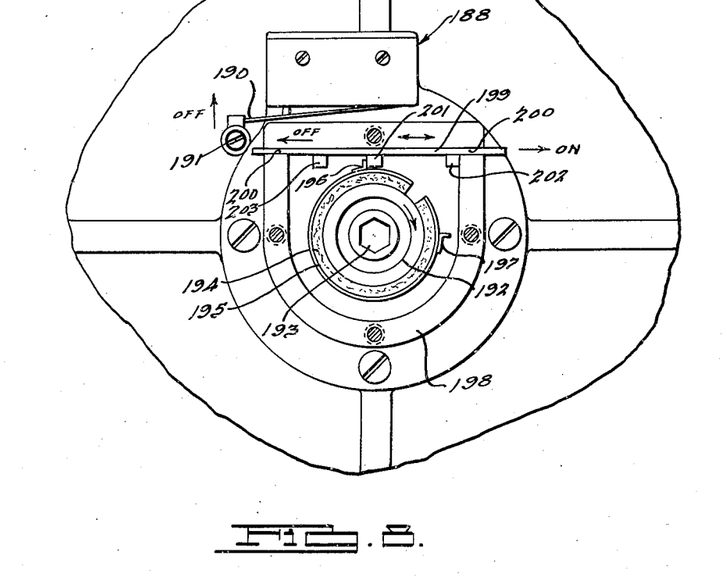
Fig. 8 is a fragmentary plan view, partly in section, of mechanism for predetermining the duration of the reverse drive cycle of the apparatus.

The switch 188, as shown in Fig. 8, has an operating lever 190 on the free end of which is provided a roller 191. This switch is associated with switch actuating mechanism which is responsive to rotation of the spindle 67 by which the screw 20 is drivingly rotated. The switch operated mechanism, shown in Fig. 8, comprises a rotor 192 which is fixed at the upper end of the spindle 67 by a bolt 193. The rotor 192 has a split ring 194 comprising frictional material disposed around its periphery which is surrounded by a split metal ring 195. The ring 195 preferably comprises resilient metal, such as spring steel, and is conditioned to frictionally urge the lining material 194 against the periphery of the rotor.

Mounted on the metal ring 195 are arcuately spaced angle brackets 196 and 197 having outwardly extending flanges. The rotor 192 is disposed within a housing 198 in which is shiftably mounted a slide bar 199. The end portions of the slide bar 199 extend outwardly of the housing 198 through slots 200 formed in the wall of the housing. The left end portion of the bar 199 is adapted to engage the roller 191 of the switch lever 190 and to move the latter to its switch opening position when this bar is shifted leftwardly, as viewed in Fig. 8.

Forward rotation of the screw 20 and of the rotor 192 is in a clockwise direction, as viewed in Fig. 8. During this clockwise rotation of the rotor 192, which occurs while the material is being discharged from the apparatus, the outwardly extending flange of the bracket 196 on the metal ring 195 abuts the left side of a lug 201 which extends downwardly from the slide bar 199. Engagement of the bracket 196 with the lug 201 prevents further rotation of the ring 195 and lining material 194 attached thereto in a clockwise direction with the rotor 192. The rotor 192 and screw with which it is connected may thus continue to rotate in a clockwise direction while the bracket 196 of the split ring 195 holds the slide bar 199 in its right hand limiting position which is established by engagement of a stop 202 carried by the slide bar, with the housing 198, as illustrated in Fig. 8. Thus, during and following a discharge operation of the machine, the contacts (not shown) of the switch 188 are maintained closed. Therefore, when the terminals 184 and 185 are engaged together after completion of a discharge operation, a circuit is completed from the wire 128 of the power control line through the conductors 178, 186, terminals 184 and 185, conductor 181, solenoid 153, and conductor 155 to the other wire 127 of the control power line, thus energizing the solenoid 153. The solenoid 153 moves the pivoted switch lever 144 in a clockwise direction about its axis 145 so as to close the contacts 149 and 150, thereby establishing a reverse drive of the motor 54. A reverse operation of the motor 54 rotates the rotor 192 in a counter-clockwise direction, as viewed in Fig. 8, and the split ring 195, lining material 194 are carried with it in a counterclockwise direction, bringing the flange of the bracket 197 into engagement with the right side of the lug 201. Further counterclockwise rotation of the split ring 195 and bracket 196 shifts the slide bar 199 leftwardly, as viewed in Fig. 8 until a stop 203 mounted on the slide bar engages the wall of the housings 198 to establish the limiting leftward position of the slide bar. As the slide bar 199 is moved to its extreme left hand limiting position, as viewed in Fig. 8, its external end portion engages the roller 191 of the switch lever 190 and rotates the latter to its off position, thereby breaking the circuit through the solenoid 153. When the circuit 153 is thus de-energized, the spring 146 returns the pivoted switch lever 144 to its neutral or horizontal position and separates the contacts 149 and 150 so as to interrupt the reverse drive operation of the motor 154. The duration of the reverse drive operation may be predetermined by suitably locating the brackets 196 and 197 in angularly spaced relationship with respect to each other. During initial driving of the apparatus in a forward discharging direction, the bracket 196 engages the left side of the lug 201 and returns the slide bar 199 to its right hand position, illustrated in Fig. 8, causing the switch 188 to be closed in preparation for the next reverse driving operation.

In Fig. 9 of the drawings is illustrated a further development of the invention which may be used in combination with the control apparatus shown in Fig. 1 or in place of the switch provided by the contacts 158 and 159 which are automatically opened in response to back pressure applied on the apparatus after the mold cavity is filled. In Fig. 9, a normally closed switch, generally designated at 204, is mounted on a bracket 205 carried by the nozzle body 14. The switch 204 is supported by the bracket 205 which is fixed to a stem 206 threaded in an aperture 207 bored in one side of the nozzle body 14. This switch has a shiftable operating plunger 208 which is normally urged outwardly to retain the contacts (not shown) of the switch 204 closed. A cantilever spring blade 209 mounted at 210 on the nozzle body extends between the plunger 208 of the switch 204 and the side of the nozzle body. This spring blade 209 has an aperture intermediate its ends through which the threaded stem 206 extends. A nut 211 threaded on the stem 206 serves to variably adjustably tension the spring blade 209 toward the side of the nozzle body. The nozzle body is provided with a passage 212 leading from the discharge passage 18 of the nozzle body at a location between the valve 45 and the nozzle element 15. A block 213, mounted on the side of the spring blade 209 and disposed between the latter and the adjacent side of the nozzle body 14, registers with and is adapted to close the outlet end of the passage 212. This block is yieldably held against the nozzle body and in closed relation with respect to the outlet end of the passage 212 by the spring blade 209 which, as previously set forth, may be adjustably tensioned to yieldably oppose uncovering of the outlet of the passage 212. A piston member 212' may be shiftably mounted in the passage 212, if desired, for contacting with the block 213 to deflect the spring 209 under the action of the pressure applied on the left end of the piston member, as viewed in Fig. 9.

The switch 204 is provided with terminals 215 and 216 which may be connected by conductors 217 and 218 to the conductors 157 and 160, shown in Fig. 9, when the switch 204 is used in place of the separable contacts 158 and 159. If the separable contacts 158 and 159 are to be employed as well as the switch 204, then the terminals 215 and 216 of the switch 204 are connected in series to the contacts 158 and 159. When the valve 45 is in its open position, as shown in Fig. 9, during a mold-filling operation, the material being molded flows into the passage 212 and applied pressure on the block 213. Deflection of the spring blade 209 in response to this pressure is opposed until the pressure thereon attains that value which exists after the mold is filled. Therefore, as soon as the mold is filled, the pressure on the plastic in the passage 18 shifts the piston 212, and deflects the lower end of the spring blade 209 rightwardly, as viewed in Fig. 9, so as to urge the plunger 208 of the switch 204 rightwardly, thereby opening the latter switch. Opening of the switch 204 when employed alone or in series with the separable contacts 158 and 159, breaks the circuit through the solenoid 152, thus releasing the pivoted switch lever 144 so as to accommodate separation of the contacts 142 and 143 which control the forward driving circuit of the motor 54.

When the switch 204 is used in combination with the separable contacts 158 and 159, the latter may be relied upon to condition the circuit of the solenoid 152 to be closed only when the nozzle of the injecting apparatus is in proper mold-filling position with respect to the mold. The switch 204 and its operating mechanism may be relied upon to discontinue the forward drive of the motor 54 after the mold is filled and pressure on the contents thereof has exceeded a predetermined value, without requiring separation of the nozzle from the mold in order to open the contacts 158 and 159.

With the foregoing control system, discharging of moldable material from the apparatus while the mold and apparatus are not in proper relative positions to receive the discharge, is guarded against. Discharging of moldable material at any time during which the mold sections are not urged together with a predetermined required force is also prevented. The valve mechanism by which the discharge of moldable material is controlled is automatically operated upon filling of the mold cavity to cut off the flow of moldable material from the nozzle and to simultaneously accommodate escapement of moldable material from the nozzle body and adjacent portions of the passages of the apparatus. This is particularly advantageous in the molding of heat hardenable substances, such as thermosetting and vulcanizable rubber compounds and unintended setting up of such molding materials is guarded against by reducing the pressure under which they are maintained between mold-filling operations.

Forward driving operation of the pressure-creating mechanism is discontinued after the mold is filled and a predetermined pressure has been applied on its contents and the pressure-creating mechanism is immediately driven in a reverse direction thereafter for a period of predetermined duration. This reverse drive of the pressure-creating mechanism, and particularly of the screw and gear type pressure-creating mechanism shown in the drawings, relieves the compression under which the material operated upon has been placed during the forward drive stage and thus guards against unintended setting of such material in the region of the pressure-creating mechanism. The resulting reduction in the pressure on the material in the vicinity of the chambers 22 and 23 guards against compacting and setting of such material in the spaces around the gears during intervals between discharge operations.

The reverse drive action also unloads the apparatus sufficiently to materially decrease the starting torque requirements during initial stages of the next successive forward driving and discharging operation of the apparatus.

While heating elements have been applied on the sides of the heating chamber, additional heating elements, such as that shown at 219 in Fig. 9, may be applied at diverse locations to uniformly heat and bring the moldable material to a desired temperature before it is introduced into a mold cavity for extruding die.

Although but several specific embodiments of the invention are herein shown and described, it will be understood that various changes in the sequence of operations, steps and materials employed may be made without departing from the spirit of the invention.

I claim:

1. Apparatus for discharging heat curable moldable compound into a mold having an inlet including a housing and nozzle assembly having a passage therethrough for conveying said compound into said mold, said nozzle being registerable with said mold inlet for filling said mold and for obstructing backflow of compound therefrom after said mold is filled, a valve in said passage adapted to close the same for preventing backflow of said compound therethrough while said nozzle is in backflow obstructing relation to said mold inlet after said mold is filled, pressure-creating means in said housing for forcing said compound through said passage and into said mold under pressure comprising a screw member rotatable in said passage, mechanism for driving said screw member in a forward pressure-creating direction while said valve is open and said nozzle is in mold-filling relation with said mold inlet and in a reverse pressure-relieving direction while said valve is closed and said nozzle is in backflow obstructing relation with respect to said mold inlet, apparatus for closing said valve, and means directly responsive to the pressure of the compound in the mold for causing said mechanism to actuate said screw member in said reverse pressure-relieving direction and simultaneously causing said valve closing apparatus to close said valve.

2. Apparatus for discharging moldable compound into a mold including a housing having a passage therein for such compound and provided with an outlet at one end of said passage, pressure-creating means in said housing for forcing said compound through said passage and outlet and into said mold comprising a conveyor-like screw rotatable in said passage, mechanism for selectively driving said screw in a forward pressure-creating direction and in a reverse pressure-relieving direction, respectively, and means responsive to the pressure of the compound in the mold for causing said mechanism to discontinue forward drive of said screw and to immediately thereafter actuate said screw in said pressure relieving direction.

3. Apparatus for discharging moldable compound into a mold having an inlet including a housing having a passage therein for such compound and provided with an outlet nozzle at one end of said passage registerable with said mold inlet for conveying said compound into said mold and for holding said compound under compression therein after said mold is filled, respectively, pressure-creating means in said housing for forcing said compound through said passage and outlet nozzle and into said mold comprising a screw member rotatable in said passage, mechanism for selectively driving said screw member in a forward pressure-creating direction while said nozzle is in mold filling relation to said mold inlet and in a reverse pressure-relieving direction after said mold in filled and while the contents thereof are retained under pressure by said nozzle, and means responsive to the pressure of the compound in the mold for causing said mechanism to discontinue forward driving of said screw member and to immediately thereafter actuate said screw member in said reverse pressure-relieving direction after said mold is filled.

4. Apparatus for discharging heat curable moldable compound into a mold having an inlet including a housing and nozzle assembly having a passage therethrough for conveying said compound into said mold, said nozzle being registerable with said mold inlet for filling said mold and for obstructing backflow of compound therefrom after said mold is filled, a valve in said passage adapted to close the same for preventing backflow of said compound therethrough while said nozzle is in backflow obstructing relation to said mold inlet after said mold is filled, pressure actuated means for holding said nozzle and mold inlet in mold filling relation during mold filling operations and in position to obstruct back flow of compound from said mold inlet after a mold filling operation and after closing of said valve, continuously operable pressure-creating means in said housing for forcing said compound through said passage and into said mold under pressure comprising a conveyor-like screw rotatable in said passage, mechanism for driving said screw in a forward pressure-creating direction while said valve is open and said nozzle is in mold-filling relation with said mold inlet and in a reverse pressure-relieving direction while said valve is closed and said nozzle is in backflow obstructing relation with respect to said mold inlet, and control means for reversing the drive of said mechanism and screw in order to relieve the pressure on the compound in the portion of said passage on the up-stream side of said valve after said mold is filled, said control means comprising apparatus for maintaining reverse operation of said driving mechanism and screw throughout a cycle of predetermined duration and thereafter discontinuing operation thereof.

5. Apparatus for discharging moldable compound into a mold including a housing having a passage therein for accommodating the flow of such compound therethrough, a nozzle communicating with the outlet end of said passage and adapted to deliver said compound to said mold, said housing having an escapement port leading from said passage, pressure-creating means for forcing said compound through said passage, mechanism for driving said pressure-creating means in forward pressure-creating and reverse pressure-relieving directions, respectively, yieldable means normally closing said escapement port and adapted to open in response to pressure applied thereon by said compound when passage thereof through said nozzle is opposed as a result of filling of said mold, and control means operable in response to opening of said yieldable escapement port closing means for reversing the operation of said pressure-creating means in order to relieve the pressure on the compound in said passage after said mold is filled.

6. Apparatus for discharging moldable compound into a mold including a housing having a passage therein for accommodating the flow of such compound therethrough, a nozzle communicating with the outlet end of said passage and adapted to deliver said compound to said mold, said housing having an escapement port leading from said passage, pressure-creating means for forcing said compound through said passage, mechanism for driving said pressure-creating means in forward pressure-creating and reverse pressure-relieving directions, respectively, yieldable means normally closing said escapement port and adapted to open in response to pressure applied thereon by said compound when passage thereof through said nozzle is opposed as a result of filling of said mold, control means operable in response to opening of said yieldable escapement port closing means for reversing the operation of said pressure-creating means in order to relieve the pressure on the compound in said passage after said mold is filled, and mechanism responsive to reverse operation of said pressure-creating means for discontinuing said reverse operation after a predetermined cycle thereof.

7. Apparatus for discharging moldable compound into a mold comprising a main body portion having a passage therein including a cylindrical bore section and provided with an outlet for delivering said compound to said mold, pressure-creating means in said main body portion including a conveyor-like screw rotatable in said bore section, driving mechanism including a reversible power-actuating unit for respectively drivingly rotating said screw in a forward direction to force said compound through said passage and into said mold and in a reverse direction to relieve the pressure on the compound in said passage when said mold is filled, and control means for reversing the operation of said power-actuating unit and screw throughout a predetermined cycle and thereafter discontinuing operation of said power-actuating unit.

8. Apparatus for discharging moldable compound into a mold comprising a main body portion having a passage therein including a cylindrical bore section and provided with an outlet for delivering said compound to said mold, pressure-creating means in said main body portion including a conveyor-like screw rotatable in said bore section, mechanism including driving means for drivingly rotating said screw in a forward direction to force said compound through said passage and into said mold and in a reverse direction to relieve the pressure on the compound in said passage when said mold is filled, means for reversing the rotation of said driving means from forward screw driving rotation to reverse screw driving rotation, and means for discontinuing said reverse drive of said screw after a predetermined annular rotation thereof.

9. Apparatus for injecting a moldable compound into a mold including an injecting unit having a discharge nozzle registerable with the inlet of said mold, means relatively shiftably mounting said injecting unit and mold for bringing said nozzle into and out of mold-filling relationship with respect to said mold inlet, pressure-creating means in said unit, mechanism for driving said pressure-creating means in a forward direction to displace said compound through said discharge nozzle under pressure and in a reverse direction to relieve the pressure on the compound in said unit, said injecting unit and mold being relatively shiftable by the action of back pressure applied thereon by said compound when said mold is filled, and means responsive to relative movement of said injecting unit and mold by said back pressure for reversing operation of said pressure-creating means to relieve the pressure on the compound in said unit after said mold is filled.

10. Apparatus for injecting a moldable compound into a mold including an injecting unit having a discharge nozzle registerable with the inlet of said mold, means relatively shiftably mounting said injecting unit and mold for bringing said nozzle into and out of mold-filling relationship with respect to said mold inlet, pressure-creating means in said unit, mechanism for driving said pressure-creating means in a forward direction to displace said compound through said discharge nozzle under pressure and in a reverse direction to relieve the pressure on the compound in said unit, said injecting unit and mold being relatively shiftable by the action of back pressure applied thereon by said compound when said mold is filled, means responsive to relative movement of said injecting unit and mold by said back pressure for reversing operation of said pressure-creating means to relieve the pressure on the compound in said unit after said mold is filled, and means for discontinuing reverse operation of said pressure-creating means after a predetermined cycle of reverse operation thereof.

11. Injection molding apparatus including a unit for injecting a moldable compound under presure, a mold including separable parts and having an inlet for receiving said compound from said unit, a valve in said unit movable to open and closed positions for accommodating and opposing respectively flow of said compound from said unit to said mold, releasable apparatus for forcefully clamping said mold parts together, mechanism for opening and closing said valve including means for maintaining said mechanism inoperative to open said valve when the pressure applied on said mold parts by said clamping apparatus is below a predetermined value, said means being responsive to the pressure applied on said mold parts for presetting said mechanism to render said mechanism operative to open said valve at a selected time subsequent to attainment of said pressure, and control means including a manually operable control member for causing said valve opening and closing mechanism to open said valve after attainment of said predetermined clamping pressure.

12. Injection molding apparatus including a unit for injecting a moldable compound under pressure, a mold including separable parts and having an inlet for receiving said compound from said unit, a valve in said unit movable to open and closed positions for accommodating and opposing respectively flow of said compound from said unit to said mold, releasable means for forcefully clamping said mold parts together including a fluid pressure cylinder and piston assembly, mechanism including an electric circuit for opening and closing said valve, a normally open fluid pressure responsive switch member in said circuit for maintaining said mechanism inoperative to open said valve while the pressure applied on said mold parts is below a predetermined value, said switch member being responsive to the fluid pressure in said cylinder for presetting said mechanism to render it operative to open said valve at a selected time subsequent to attainment of said predetermined pressure, a second switch in said circuit, and control means including a manually operable control member for closing said second switch and causing said valve opening and closing mechanism to open said valve after attainment of said predetermined clamping pressure.

13. A method of molding a composition of the type which hardens when it is heated at a predetermined temperature for a predetermined period, which comprises the steps of forcing said composition in a heated and plastic state from a storage space into a heated molding space under high pressure by operating a displacing member in one direction in said storage space, said composition being forced through a restricted channel in its travel toward said molding space, closing said channel substantially immediately after said molding space has been filled so as to retain the compound in said molding space under pressure, relieving the pressure on the compound in said storage space prior to solidification of the compound in said channel by reversing the operation of said displacing member while said channel is closed, and curing the composition in said molding space thereafter.

14. A method of molding a composition of the type which hardens when it is heated to a predetermined temperature, which comprises the steps of forcing said composition in a heated and plastic state from a storage space into a heated molding space under high pressure by operating a displacing member in one direction in said storage space, said composition being forced through a restricted channel in its travel to said molding space, relieving the pressure on the composition in said storage space substantially immediately after said molding space has been filled by reversing the operation of said displacing member prior to solidification of said compound in said channel, and maintaining the pressure in said channel and in said molding space by obstructing back flow of said composition through said channel for a period of time sufficient to cause the composition in said channel to become at least partially solidified and to cure the composition in said molding space.

15. Apparatus for molding plastic-like material comprising separable mold members, clamping means for holding said members together under pressure during mold-filling operations, an injecting unit comprising a body portion having a passage therein and provided at one end with a discharge nozzle for delivering said material to said mold, pressure-creating means in said body portion for forcing said material through said nozzle under pressure, mechanism for driving said pressure-creating means in a forward direction for discharging plastic from said nozzle and in a reverse direction for relieving the pressure on the material in said passage when said mold is filled, said passage having an escapement port for accommodating the flow of said material from said passage to assist in relieving the pressure under which said material is placed during mold-filling operations, valve means in said passage for controlling the flow of said material to said nozzle and through said port adapted to close said port when it accommodates the flow of said material to said nozzle and open said port when it obstructs the flow of said material to said nozzle, and a system for controlling the operation of said driving mechanism, clamping means and valve means including an electric control circuit having a clamping pressure responsive switch therein for rendering said circuit inoperative to initiate operation of said driving mechanism until the pressure applied by said clamping mechanism attains a predetermined value, said circuit including means responsive to the pressure of the material in the mold for causing said mechanism to actuate said pressure-creating means in said reverse pressure-relieving direction throughout a predetermined cycle and simultaneously shifting said valve means to open said port and obstruct the flow of plastic to said nozzle.

16. Apparatus for discharging moldable compound into a mold comprising a main body portion having a passage therein including a bore section and a communicating chamber extending laterally from said bore, pressure creating means in said main body portion including a conveyor-like screw rotatable in said bore section and a gear element rotatable in said chamber and meshed with the thread of said screw for holding compound propelled by said screw against turning therewith, mechanism including driving means for drivingly rotating said screw and gear in forward directions to force said compound through said passage and into said mold and in reverse directions to relieve the pressure on the compound in said passage following a mold filling operation and to guard against compacting of said compound in said chamber and around said gear after operation of said screw is discontinued, means for changing the rotation of said driving means from forward screw driving rotation to reverse screw driving rotation, and means for discontinuing reverse drive of said screw after a predetermined reverse rotation thereof.

17. Apparatus for discharging plastic-like compound into a device for forming it to a desired shape comprising a main body portion having a passage therein including a bore section and a communicating chamber extending laterally from said bore, pressure creating means in said main body portion including a conveyor-like screw rotatable in said bore section and a gear element rotatable in said chamber and meshed with the thread of said screw for holding compound propelled by said screw against turning therewith, mechanism including driving means for drivingly rotating said screw and gear in forward directions to force said compound through said passage and into said device and in reverse directions to relieve the pressure on the compound in said passage following a discharge operation and to guard against compacting of said compound in said chamber and around said gear after said forward operation of said screw is discontinued, and means for changing the rotation of said driving means from forward screw-driving rotation to reverse screw driving rotation.

18. Apparatus for discharging plastic-like compound into a device for forming it to a desired shape comprising a main body portion having a passage therein including a bore section and provided with an outlet for delivering said compound to said device, pressure-creating means in said main body portion including a conveyor-like screw rotatable in said bore section, mechanism including driving means for drivingly rotating said screw in a forward direction to force said compound through said passage and into said device and in a reverse direction to relieve the pressure on the compound in said passage after a discharge operation, means for changing the rotation of said driving means from forward screw driving rotation to reverse screw driving rotation, and means for discontinuing said reverse drive of said screw after a predetermined reverse rotation thereof.

19. Apparatus for discharging moldable compound into a mold comprising a main body portion having a passage therein including a cylindrical bore section and provided with an outlet for delivering said compound to said mold, pressure-creating means in said main body portion including a conveyor-like screw rotatable in said bore section, mechanism for selectively driving said screw in a forward pressure-creating direction and in a reverse pressure-relieving direction, respectively, and means responsive to the pressure of the compound in the mold for causing said mechanism to actuate said pressure-creating means in said reverse pressure-relieving direction.

20. In combination, a mold having an inlet; and injecting apparatus for discharging moldable compound into a mold comprising a main body portion having a passage therein including a cylindrical bore section and provided with an outlet for delivering said compound to said mold, means relatively shiftably mounting said injecting unit and mold for bringing said outlet into mold-filling relationship with said mold inlet, said injecting unit and mold being relatively shiftable by the pressure of the compound in the mold, pressure-creating means in said main body portion including a conveyor-like screw rotatable in said bore section, mechanism for selectively driving said screw in a forward pressure-creating direction and in a reverse pressure-relieving direction, respectively, and control means responsive to relative movement of said mold and injecting unit by said pressure for reversing the operation of said driving mechanism and pressure-creating means after said mold is filled.

21. The method of molding a composition of the type which hardens when it is heated to a predetermined temperature which comprises the steps of propelling said composition in a heated and plastic state in one direction through a confined passage from a storage space to a molding space by screw action upon said composition until said molding space is filled, relieving the pressure on the composition in said passage after said molding space has been filled and prior to solidification of said composition by reversing said screw action and propelling the composition in said passage in an opposite direction, maintaining the pressure on the composition in said molding space, and heating the contents of said molding space to a cured state.

22. The method of forming a moldable compound which hardens when it is heated to a predetermined temperature which comprises the steps of propelling said composition in a heated and plastic state in one direction through a heated confined passage from a storage space to a forming space by screw action upon said compound, and relieving the pressure on the compound in said passage after a forming operation and prior to sustained interruption of said screw action by reversing said screw action and thereby propelling the composition at spaced locations in said passage in an opposite direction.

23. Apparatus for injecting moldable compound into a mold including an injecting unit comprising a body portion having a passage therein and provided at one end with a discharge nozzle for delivering said material to said mold, means for shiftably mounting said unit for movement into and out of mold-filling relationship with respect to said mold, pressure-creating means in said body portion for forcing said material through said nozzle under pressure, mechanism for driving said pressure creating means in a forward direction for discharging compound from said nozzle and in a reverse direction for relieving the pressure on the compound in said passage when said mold is filled, said passage having an escapement port for accommodating the flow of said material from said passage to assist in relieving the pressure under which said comtpound is placed during mold-filling operation, valve means in said passage for controlling the flow of said compound to said nozzle and through said port adapted to close said port when it accommodates the flow of said compound to said nozzle and open said port when it obstructs the flow of said compound to said nozzle, and control means responsive to shifting movement of said unit by back pressure for reversing said driving mechansim and simultaneously shifting said valve means to open said port and obstruct the flow of plastic to said nozzle when said mold is filled.

24. The method of molding heat-curing plastic compound which comprises the steps of bringing a plastic discharge nozzle and mold inlet into engaged mold filling relationship, injecting a mold filling charge of said compound under pressure through a passage leading through said nozzle to said mold inlet from a source of said compound at a temperature above that at which it cures under said pressure but below that at which it cures in the absence of said pressure, continuing the application of said pressure on said source until said mold is filled, closing said passage at said nozzle after said mold is filled and while said nozzle is retained in opposing relationship to outward flow of said compound from said mold inlet, discontinuing the application of pressure on said source and relieving the pressure previously applied on the compound in said passage between said source and the location at which said passage is closed by propelling the compound in said passageway from said nozzle, said discontinuation of the application of pressure and relief of previous applied pressure occurring after secession of the flow of compound through said nozzle within a time interval of insufficient duration to accommodate significant setting of compound under the pressure and temperature to which it was subjected during the mold filling operation, and thereafter heating said mold to cure the compound therein.

25. In combination, a mold having an inlet opening; and apparatus including an injecting unit comprising a nozzle having a discharge passage communicating with said inlet opening, means in said unit for discharging said compound under pressure through said passage, mechanism for driving said means in forward pressure-creating and reverse pressure-relieving directions, respectively, said mold and nozzle being relatively movable to separate the same in response to back pressure on said nozzle upon complete filling of said mold, and a control system for said driving mechanism including means actuated in response to said relative separatory movement of said nozzle and mold for reversing operation of said driving mechanism after said mold has been filled.

26. The method of forming a moldable compound to predetermined shape which comprises the steps of propelling said compound in a heated and plastic state in one direction through a passage from a storage space to a forming space by screw action upon said compound, relieving the pressure on the compound in said passage after a forming operation and prior to solidification of said compound in said forming space by propelling the compound at spaced locations in said passage in an opposite direction under a reverse screw action, and solidifying the compound delivered to said forming space after reversal of said screw action on the compound in said passage.

27. Apparatus for injecting a moldable compound into a mold including an injecting unit having a discharge nozzle registerable with the inlet of said mold, means relatively shiftably mounting said injecting unit and mold for bringing said nozzle into and out of mold-filling relationship with respect to said mold inlet, means for yieldably holding said injecting unit and mold in mold-filling relationship, pressure-creating means in said unit, mechanism for driving said pressure-creating means in a forward direction to displace said compound through said discharge nozzle under pressure and in a reverse direction to relieve the pressure on the compound in said unit, said injecting unit and mold being relatively shiftable against the action of said yieldable holding means by the action of back pressure applied thereon by said compound when said mold is filled, and means responsive to relative movement of said injecting unit and mold by said back pressure for reversing operation of said pressure-creating means to relieve the pressure on the compound in said unit after said mold is filled.

28. In combination, a mold including separable parts and having an inlet, apparatus for forcibly clamping said mold parts together; and an injecting unit for injecting a moldable compound into said mold comprising a discharge nozzle registerable with the inlet of said mold, means relatively shiftably mounting said injecting unit and mold for bringing said nozzle into and out of mold-filling relationship with respect to said mold inlet, means for relatively shifting said mold and injecting unit into mold-filling relationship, and control mechanism for said shifting means including an element responsive to the clamping pressure of said clamping apparatus for rendering said control mechanism operative to initiate relative shifting of said mold and injecting unit into mold-filling relationship only when said clamping pressure is above a predetermined value.

WALTER P. COUSINO.

REFERENCES CITED

The following references are of record in the file of this patent:

UNITED STATES PATENTS

| Number | Name | Date |
| --- | --- | --- |
| 1,164,276 | Fogarty | Dec. 14, 1915 |
| 1,463,094 | Rigby | July 24, 1923 |
| 1,993,942 | Novotny | Mar. 12, 1935 |
| 2,090,489 | Sommerfeld | Aug. 17, 1937 |
| 2,103,546 | Morrell | Dec. 28, 1937 |
| 2,187,212 | MacMillin | Jan. 16, 1940 |
| 2,202,140 | Burroughs | May 28, 1940 |
| 2,317,331 | Mearig | Apr. 20, 1943 |
| 2,318,031 | Tucker | May 4, 1943 |
| 2,349,176 | Kopitke | May 16, 1944 |
| 2,367,204 | Cousino | Jan. 16, 1945 |
| 2,402,805 | Cousino | June 25, 1946 |

FOREIGN PATENTS

| Number | Country | Date |
| --- | --- | --- |
| 467,753 | Germany | Oct. 30, 1928 |

Certificate of Correction

Patent No. 2,487,426 November 8, 1949

WALTER P. COUSINO

It is hereby certified that errors appear in the printed specification of the above numbered patent requiring correction as follows:

Column 12, line 63, for the numeral and comma "212," read *212'*; column 14, line 59, for the words "mold in" read *mold is*; column 17, line 10, for "presure" read *pressure*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*